US008109766B2

(12) United States Patent
Russell, II et al.

(10) Patent No.: US 8,109,766 B2
(45) Date of Patent: Feb. 7, 2012

(54) METHOD FOR PREDICTED REACTOR SIMULATION

(75) Inventors: William Earl Russell, II, Wilmington, NC (US); David Joseph Kropaczek, Wilmington, NC (US)

(73) Assignee: Global Nuclear Fuel-Americas LLC, Wilmington, NC (US)

( * ) Notice: Subject to any disclaimer, the term of this patent is extended or adjusted under 35 U.S.C. 154(b) by 1254 days.

(21) Appl. No.: 10/677,239

(22) Filed: Oct. 3, 2003

(65) Prior Publication Data

US 2005/0089831 A1    Apr. 28, 2005

(51) Int. Cl.
  G09B 19/00    (2006.01)
  G09B 9/00     (2006.01)
  G09B 25/00    (2006.01)
(52) U.S. Cl. ..................................................... 434/218
(58) Field of Classification Search ................... 434/218
  See application file for complete search history.

(56) References Cited

U.S. PATENT DOCUMENTS

| 3,916,445 | A  | * | 10/1975 | Alliston et al. ............... 376/217 |
| 3,919,720 | A  | * | 11/1975 | Alliston ........................... 700/23 |
| 4,828,787 | A  | * | 5/1989  | Distler et al. .................. 376/245 |
| 5,200,144 | A  | * | 4/1993  | Berta .............................. 376/463 |
| 6,212,488 | B1 |   | 4/2001  | Meier et al. |
| 6,931,090 | B2 | * | 8/2005  | Chao et al. ..................... 376/267 |
| 7,222,061 | B2 | * | 5/2007  | Russell et al. .................. 703/18 |
| 2004/0191734 | A1 | * | 9/2004 | Russell et al. ................ 434/218 |

FOREIGN PATENT DOCUMENTS

| EP | 1113457 A1 | 12/2000 |
| TW | 430758     | 4/2001  |

OTHER PUBLICATIONS

Jul. 23, 2010 Office Action in Corresponding Japanese Application 2004-289813 w/ English translation.

\* cited by examiner

*Primary Examiner* — Kesha Y. Frisby
(74) *Attorney, Agent, or Firm* — Harness, Dickey & Pierce

(57) ABSTRACT

In the method for reactor simulation, a user modifies one or more design inputs used in creating a response surface. The response surface defines relationships between the design inputs and operational outputs of at least one or more aspects of a core design. A reactor simulation is then generated based on the response surface for the core design and the modified design input.

34 Claims, 15 Drawing Sheets

METHOD FOR PREDICTED REACTOR SIMULATION

BACKGROUND OF THE INVENTION

A nuclear reactor core includes many individual components that have different characteristics that may affect a strategy for efficient operation of the core. For example, a nuclear reactor core has many, e.g., several hundred, individual fuel assemblies (bundles) that have different characteristics and which must be arranged within the reactor core or "loaded" so that the interaction between fuel bundles satisfies all regulatory and reactor design constraints, including governmental and customer specified constraints. Similarly, other controllable elements and factors that affect the reactivity and overall efficiency of a reactor core must also be taken into consideration if one is to design or develop an effective control strategy for optimizing the performance of a reactor core at a particular reactor plant. Such "operational controls" (also referred to interchangeably herein as "independent control-variables" and "design inputs") include, for example, various physical component configurations and controllable operating conditions that can be individually adjusted or set.

Besides fuel bundle "loading", other sources of control variables include "core flow" or rate of water flow through the core, the "exposure" and the "reactivity" or interaction between fuel bundles within the core due to differences in bundle enrichment, and the "rod pattern" or distribution and axial position of control blades within the core. As such, each of these operational controls constitutes an independent control-variable or design input that has a measurable effect on the overall performance of the reactor core. Due to the vast number of possible different operational values and combinations of values that these independent control-variables can assume, it is a formidable challenge and a very time consuming task, even using known computer-aided methodologies, to attempt to analyze and optimize all the individual influences on core reactivity and performance.

For example, the number of different fuel bundle configurations possible in the reactor core can be in excess of one hundred factorial. Of the many different loading pattern possibilities, only a small percentage of these configurations will satisfy all of the requisite design constraints for a particular reactor plant. In addition, only a small percentage of the configurations that satisfy all the applicable design constraints are economically feasible.

Moreover, in addition to satisfying various design constraints, since a fuel bundle loading arrangement ultimately affects the core cycle energy (i.e., the amount of energy that the reactor core generates before the core needs to be refueled with new fuel elements), a particular loading arrangement needs to be selected that optimizes the core cycle energy.

In order to furnish and maintain the required energy output, the reactor core is periodically refueled with fresh fuel bundles. The duration between one refueling and the next is commonly referred to as a "fuel-cycle" or "core-cycle" of operation and, depending on the particular reactor plant, is on the order of twelve to twenty-four (typically eighteen) months. At the time of refueling, typically one third of the least reactive fuel are removed from the reactor and the remaining fuel bundles are repositioned before fresh fuel bundles are added. Generally, to improve core cycle energy higher reactivity bundles should be positioned at interior core locations. However, such arrangements are not always possible to achieve while still satisfying plant specific design constraints. Since each fuel bundle can be loaded at a variety of different locations relative to other bundles, identifying a core loading arrangement that produces optimum performance of the core for each fuel-cycle presents a complex and computation-intensive optimization problem that can be very time consuming to solve.

During the course of a core-cycle, the excess energy capability of the core, defined as the excess reactivity or "hot excess", is controlled in several ways. One technique employs a burnable reactivity inhibitor, e.g., Gadolinia, incorporated into the fresh fuel. The quantity of initial burnable inhibitor is determined by design constraints and performance characteristics typically set by the utility and by the Nuclear Regulatory Commission (NRC). The burnable inhibitor controls most, but not all, of the excess reactivity. Consequently, "control blades" (also referred to herein as "control rods")—which inhibit reactivity by absorbing nuclear emissions—are also used to control excess reactivity. Typically, a reactor core contains many such control blades which are fit between selected fuel bundles and are axially positionable within the core. These control blades assure safe shut down and provide the primary mechanism for controlling the maximum power peaking factor.

The total number of control blades utilized varies with core size and geometry, and is typically between 50 and 150. The axial position of the control blades (e.g., fully inserted, fully withdrawn, or somewhere in between) is based on the need to control the excess reactivity and to meet other operational constraints, such as the maximum core power peaking factor. For each control blade, there may be, for example, 24 or more possible axial positions and 40 "exposure" (i.e., duration of use) steps. Considering symmetry and other requirements that reduce the number of control blades that are available for application at any given time, there are many millions of possible combinations of control blade positions for even the simplest case. Of these possible configurations, only a small fraction satisfies all applicable design and safety constraints, and of these, only a small fraction is economical. Moreover, the axial positioning of control blades also influences the core cycle energy that any given fuel loading pattern can achieve. Since it is desirable to maximize the core-cycle energy in order to minimize nuclear fuel cycle costs, developing an optimum control blade positioning strategy presents another formidable independent control-variable optimization problem that must also be taken into consideration when attempting to optimize fuel-cycle design and management strategies.

Traditionally, reactor fuel-cycle design and management, including core loading and control blade positioning determinations as well as optimization strategies concerning other variable operational controls, are determined on a "trial-and-error" basis based primarily on the past experiences of the reactor core design engineers. Due to circumstances that require a rapid response to changing plant operating conditions, a core design engineer may be faced with the formidable challenge of specifying values for over 200 independent control-variables within a very short time frame. The impact, for example, of a particular suggested core loading arrangement or a control blade positioning arrangement on reactor performance over the duration of a core-cycle is usually determined by individual computer simulations. If a particular design constraint is not satisfied by an identified arrangement, then the arrangement is modified and another computer simulation is run. Because of the relatively long computer simulation time required for assessing the impact of a change in the value of even a single given independent control-variable, man-weeks of human and computer resources are typically required before an appropriate fuel-cycle design is identified using this procedure.

Moreover, using this trial-and-error approach, once a fuel-cycle design arrangement that satisfies all design and safety constraints has been identified, it may turn out that the identified arrangement may not provide the actual maximum cycle-energy. Therefore, this trial-and-error process must continue until the engineers believe that an optimum fuel-cycle design for the core has been identified. In practice, however, it is very possible that a particular core arrangement that is not consistent with the engineers' past experience may be the actual optimum fuel-cycle design for the core. Such an actual optimum core arrangement, however, may not necessarily be identified through the above described trial and error process.

SUMMARY OF THE INVENTION

The present invention provides a predicted reactor simulation method and apparatus. The present invention uses a response surface for a reactor as a form of cyber-workspace for generated simulation results. A response surface defines a relationship between design inputs (i.e., control variables) and operational outputs (i.e., performance parameters) of one or more aspects of core design. In one exemplary embodiment, the response surface characterizes the relation between a design input and an operational output as a polynomial function.

Using these numerous polynomial functions as predictors, an exemplary embodiment of the present invention derives operation outputs for a reactor core using a set of design inputs wherein one or more of the design inputs have been modified based on user input. Because the response surface generates the operational output results using the relatively simple polynomials represented by the response surface, the operational output values are generated in real time. This is contrasted with the relatively lengthy process taken by conventional reactor simulators to generate operational output values.

BRIEF DESCRIPTION OF THE DRAWINGS

The present invention will become more fully understood from the detailed description given below and the accompanying drawings, wherein like elements are represented by like reference numerals, which are given by way of illustration only and thus are not limiting on the present invention and wherein.

DETAILED DESCRIPTION

The present invention uses a response surface as a type of cyber-workspace, and allows for real-time predicted reactor simulations. A response surface defines the relationships between a number of design inputs and an number of operation outputs for one or more aspects of reactor core design. Accordingly, prior to describing the present invention, a detailed description of creating the response surface is provided in the context of a method of optimizing a reactor core design using the response surface. Subsequently, the method for predicted reactor core simulation will be provided.

Creating a Response Surface

The following description is directed toward an exemplary embodiment for creating a response surface. The methodology for creating the response surface may be operative as an end-user application running, for example, under the Microsoft® Windows 95/NT environment. However, creation of the response surface is not limited to any particular computer system or any particular environment. Instead, those skilled in the art will find that the system and methods presented herein may be advantageously applied to environments requiring management and/or optimization of any multiple control-variable critical industrial/scientific process or system, including chemical and mechanical process simulation systems, pressurized water reactor simulation systems, boiling water reactor simulation systems, and the like. Moreover, the system may be embodied on a variety of different platforms, including UNIX, LINUX, Macintosh, Next Step, Open VMS, and the like. Therefore, the description of the exemplary embodiments which follows is for purposes of illustration and not limitation.

Figure 1A:
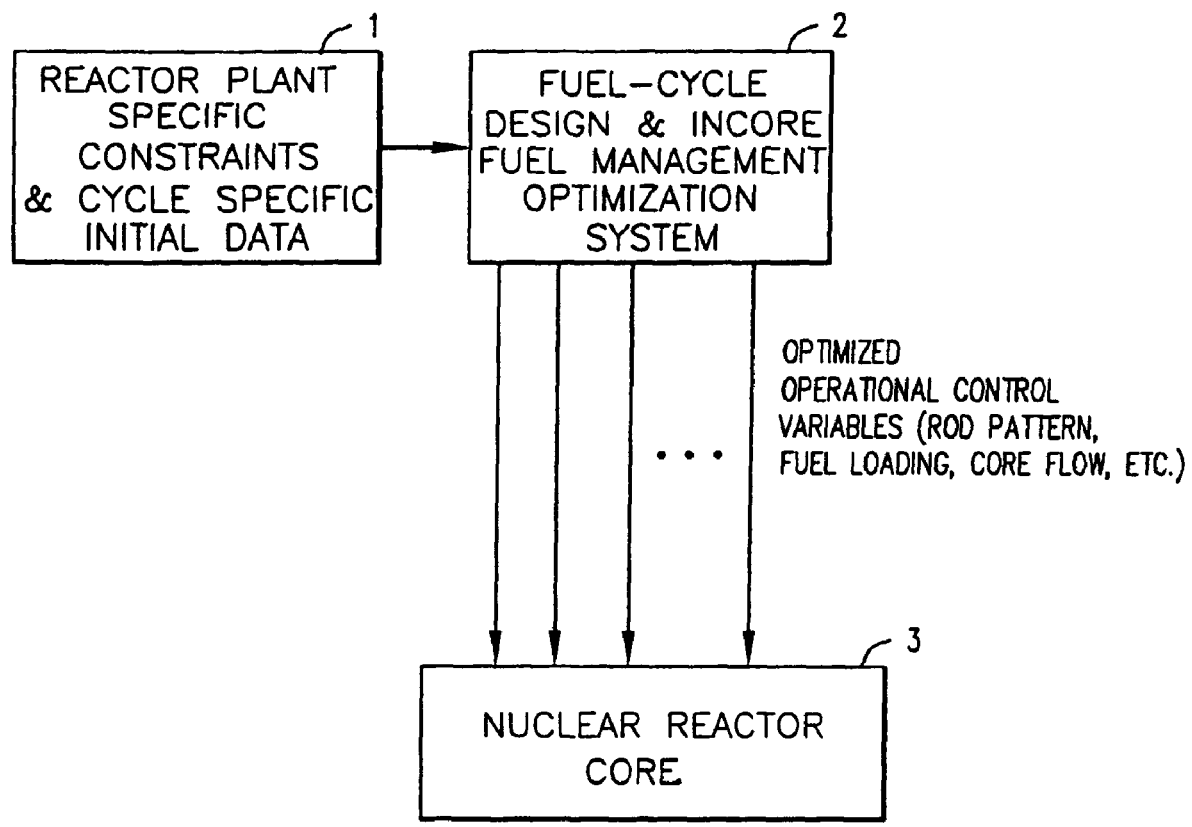
FIG. 1A is a block diagram illustrating a system for the optimization of multiple operational control-variables for a nuclear reactor.

Referring first to FIG. 1A, a block diagram illustrates an example system embodiment for optimization of multiple operational control-variables or design inputs for a nuclear reactor. Reactor plant specific design constraints and cycle specific initial data, 1, defining a particular reactor core, 3, are provided as input data to the optimization system 2. Optimized values for operational control variables or design inputs (e.g., rod pattern, fuel loading, core flow, etc.) are provided as outputs for use in the design and management of the nuclear reactor core.

Figure 1B:
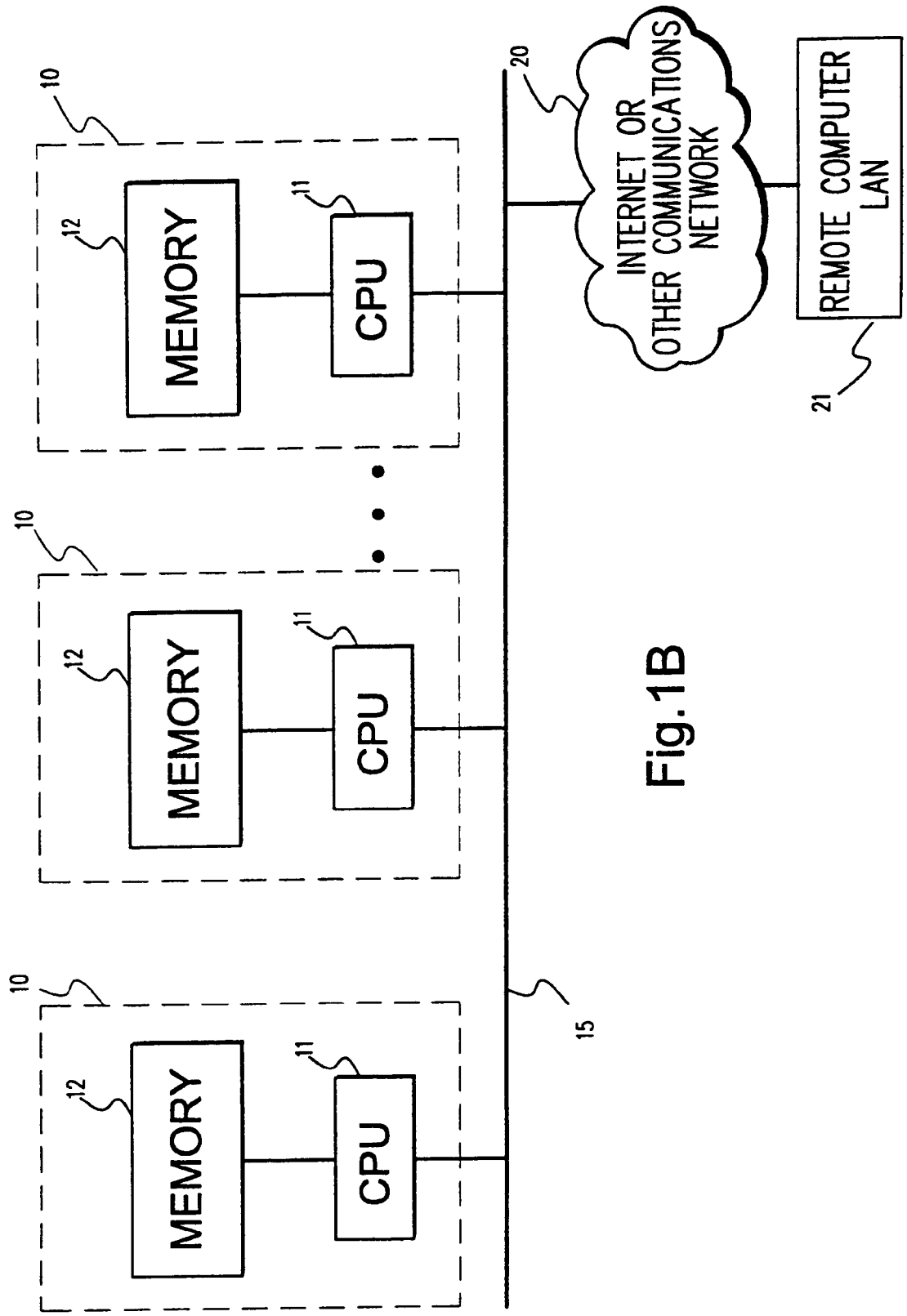
FIG. 1B is a schematic illustration of an example network arrangement of independent processors in which the present invention may be embodied.

Referring to FIG. 1B, an example computer network arrangement is shown on which the optimization method that includes creating a response surface may be embodied. A plurality of general purpose computers/processors 10/11 are coupled to a local area communications network (LAN) 15, which may itself be coupled to one or more distinct open or private access network(s) 20 for communications with one or more remote computers 21. In a preferred embodiment, the multiple control-variable optimization method is implemented via software modules resident on at least one of computers 10. As explained below, the modules may be distributed among computers 10 or may be resident on one or more of computers 10 (and 21) that communicate via LAN 15 and/or network(s) 20.

As represented in FIG. 1B, communications network 15 and/or 20 can be an open network, such as the Internet, or a private access network, such as a local area network (LAN) or a wide area network (WAN). General purpose computers 10 are coupled directly or via a modem to network 15 and consist of independent processor 11 with or without dedicated memory 12 in addition to conventional I/O and user interface components (not shown). Computers 10 can be any of a variety of high speed processors, for example, a VMS-Alpha computer system, a Legacy computer system, a high-speed work station or a high-speed compatible personal computer (such as a desk-top or laptop system). Communications over the networks 15 and 20 can be accomplished using any preferred combination of conventional and proprietary protocols that facilitates efficient inter-processor communications such as, for example, the TCP/IP protocol.

Two or more of computers 10 (21), preferably systems that are capable of supporting the execution of appropriate software for the simulation of nuclear reactor core operations, are coupled via some communications link(s) such as LAN 15 and/or network 20 for exchanging data files and control information. Most any conventional reactor core simulation program (or suite of programs), such as for example, General Electric's (GE's) "PANACEA" 3-D reactor core simulation program, may be used in conjunction with the present invention. This type of simulator program is capable of processing three dimensional variables defining the core. An input file containing values for selected "independent" reactor control-variables or design inputs (e.g., fuel loading, rod pattern, core flow, etc.) is provided as an input and the simulator program provides an output file comprising values for selected performance parameters or operational outputs. For example, the operational outputs include but are not limited to parameters conventionally used to gauge reactor core performance over the fuel operating cycle, such as critical power ratio (CPR), shutdown margin (SDM), maximum average planar linear heat generation rate (MAPLHGR), maximum fraction of linear power density (MFLPD), Hot excess reactivity, radial and axial power peaking, peak fuel rod and bundle exposure, Uranium utilization as measured by reactor energy output produced (in mega-watt-days) per kilogram of Uranium-235 loaded, etc.

Many of the performance parameters analyzed are both spatially and time dependent, such as, for example, MAPLHGR, MFLPD, and minimum critical power ratio (MCPR). Accordingly, some of these operational outputs may be indicative of the state of the reactor core at a plurality of discrete intervals (i.e., each and every "exposure step") throughout one or more core refueling cycles.

Figure 2:
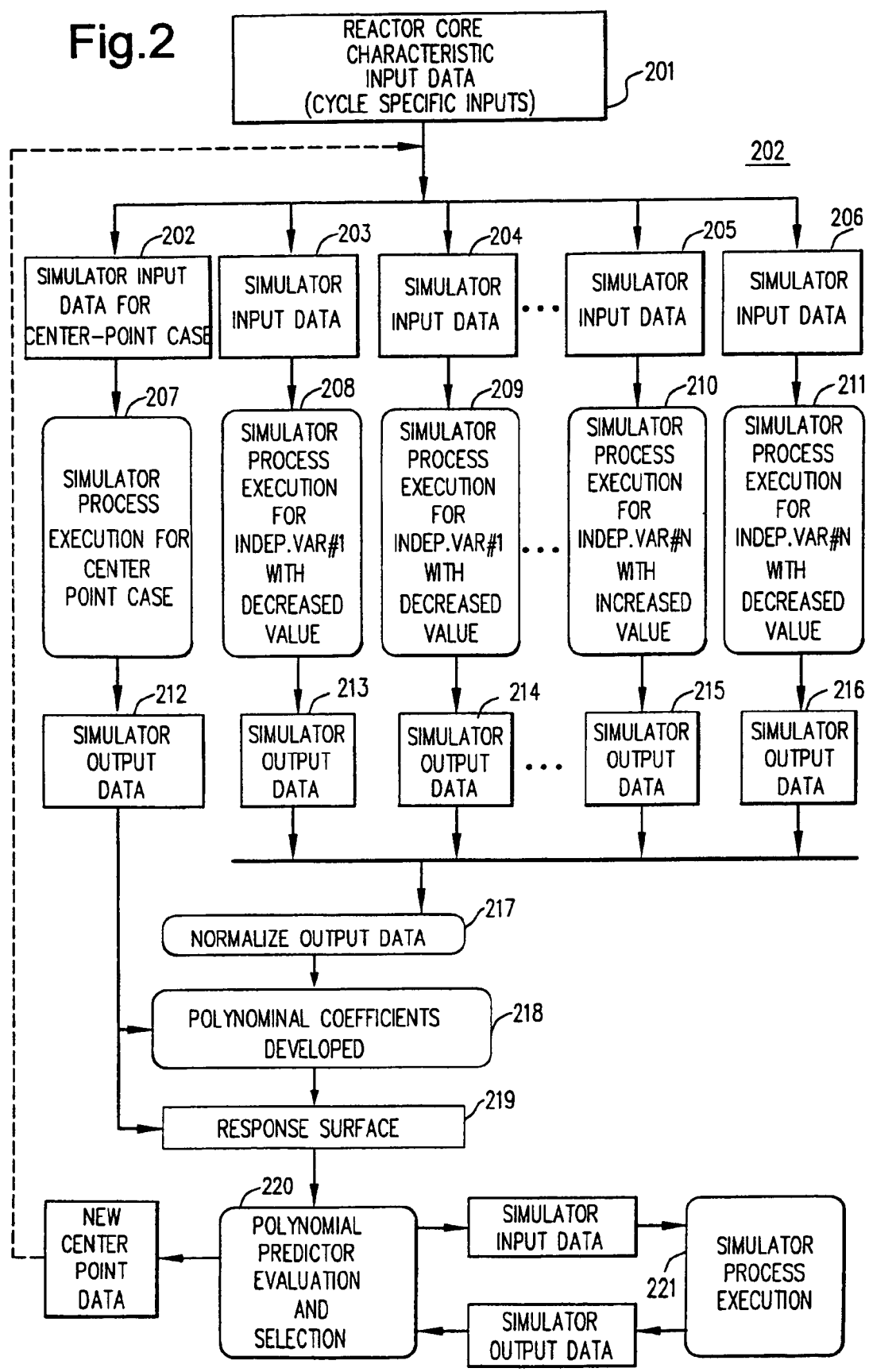
FIG. 2 is a data flow diagram illustrating the basic data flow between processes in an example embodiment of a software system for implementing the reactor core multiple control-variable optimization.

Referring now to FIG. 2, the basic functional processes and data flow within an example software system 200 for implementing the multiple control-variable optimization method, which creates the response surface, are described. Information concerning a selectable "resolution" level (explained in greater detail below), other processing options and the reactor core cycle-specific input data information is preferably input by the user at an initial stage (not shown). A cycle-specific reactor core profile input file 201, containing reactor core characteristics and operational critical-to-quality constraints specific to a particular reactor plant for a particular fuel-cycle, is built from this user-input information. The cycle-specific input data is used to identify initial independent control-variable or design input values that define an initial "center-point" data case for a particular reactor. This center-point data is provided as an input data file 202 to a reactor core simulation program (actual simulation program not shown). A reactor core operation simulation 207 is conducted using the center-point data. For example, a three-dimensional (3-D) analysis core simulation is performed on a selected "host" computer 10. When the simulation process is complete, a center-point case simulation output data file 212 is produced. The center-point case simulation output data from this file is then stored in a multidimensional array within the digital storage memory of the selected "host" computer 10 and is used as the basis for creating a type of response surface 219 for evaluating the reactor performance for different control-variable values.

Next, separate simulations of the same reactor core operating under different physical conditions and constraints represented by predetermined changes in independent control-variable values for selected operational control variables are conducted contemporaneously by the software system. Different simulator input data files 203-206 are created, each reflecting a change in a value for a selected control-variable (i.e., design input), and each input file is submitted to an independent reactor core simulator program or process 208-211 resident on one or more independent computers or processors 10,21 connected via the communications network 15,20. After performing a core simulation based on the values in the received input file, each simulator process returns an output data file 213-216 reflecting the resultant output values of the dependent variables (i.e., operational outputs) of the reactor core. Once all of the reactor core simulations for each of the independent variable cases 208-211 are complete, the data from simulator output files 213-216 is normalized as indicated at block 217, for example, by dividing each data item by output data obtained from the original "center-point" case 212.

After all the simulation case output data is normalized, the normalized data for each independent control-variable case is characterized as a transfer function. For example, the normalized data is mapped to a set of corresponding second-order polynomials reflecting the change in a given simulator output with respect to a change in a given control variable; however, polynomials of higher or lesser orders may be used. In other words, second-order polynomials, each of which is characterized by a set of associated polynomial coefficients, are selected to fit the simulation output data obtained in a few limited number of reactor core simulations. For instance, three simulations are exemplary used for evaluating each independent control-variable: a center-point case and two variation cases; wherein the center-point case quantitative value for the particular control-variable is respectively incremented and decremented. The polynomials are then utilized as "predictors" to predict quantitative values of selected operational outputs (i.e., performance parameters) for each control-variable. Coefficients which uniquely define each polynomial are developed from the normalized simulator output data, as indicated at block 218, using conventional algorithmic techniques for solving second-order polynomials (e.g., curve fitting). This normalized coefficient data is stored in an area of computer memory defined herein as the "response surface", as represented by block 219. Basically, response surface 219 contains the dependent operational output (performance parameter) response or relationship of the reactor to individual or combined changes in values of the design input (control-variables). In this manner, the response surface serves as sort of a cyber-workspace and data-array repository for storing the resultant reactor core simulation output data from different case simulations for multiple independent control-variables.

Next, the polynomials for each control-variable are evaluated 220 applying changes to the values in said control-variables spanning each control-variables permissible range and a best polynomial predictor is selected. As discussed in further detail with respect to the Polynomial Optimization And Evaluation Module and FIG. 7, another simulation process 221 is conducted using control-variable values provided by the selected best polynomial predictor to evaluate the modified values. If an improvement in reactor performance is indicated by the simulation results, the modified control-variables are accepted as an improvement over the initial center-point case. This new combination of independent variables is then re-defined as the new center-point case and the entire control-variable evaluation process is again repeated (as indicated by the dotted line in FIG. 2) until no further significant improvements are realized. As such the response surface is modified and grown through this process. Once it is determined that no further improvements are obtainable, the response surface is refined using a smaller (more limited) range for control-variable values and the above steps are repeated. The optimization process as a whole is considered essentially completed when no further improvements to the control-variables are discernible and no feasible reduction to the range of control-variable values can be made.

Figure 3:
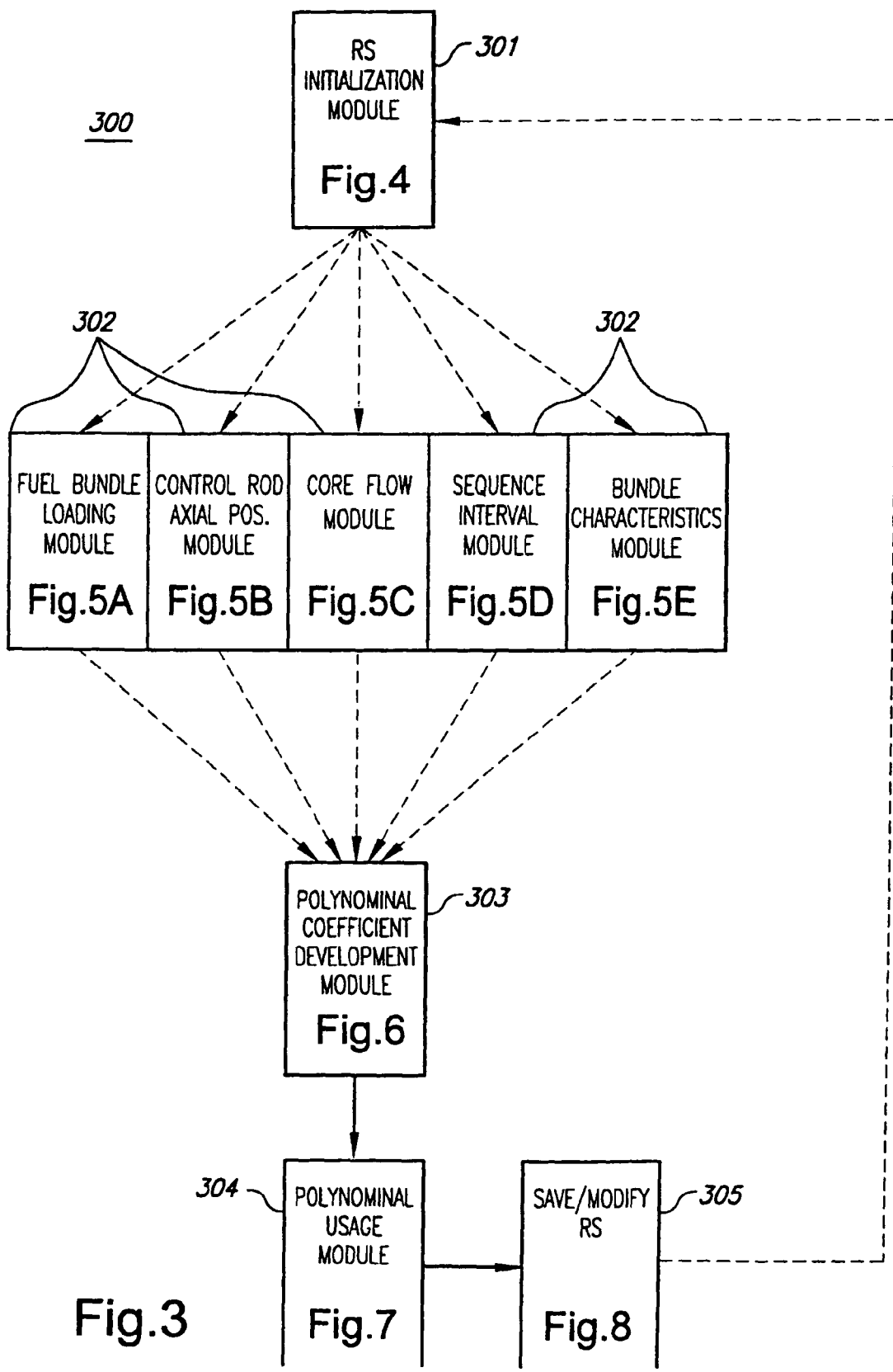
FIG. 3 is a block diagram illustrating an example embodiment of a software system for implementing the reactor core multiple control-variable optimization method.

In FIG. 3, an overview of an example software system 300 for implementing the multiple control-variable optimization method is illustrated in terms of functionally related sections or "modules" with references to separate accompanying FIGS. 4-8 that show example functional program control steps for each module in greater detail. One or more modules of software system 300, including the software system in its entirety, may be embodied on a computer-readable medium for ease of distribution and installation on one or more processors or networked computer systems. Although sections of functionally related software are described herein in terms of component software modules that may be individually or collectively executed by separate processors, the software system need not necessarily be limited to a modular component implementation. As indicated in FIG. 3, an example embodiment of software system 300 includes a Response Surface Initialization Module 301, one or more Control-Variable Modules 302, a Polynomial Coefficient Development Module 303, a Polynomial Usage Module 304 and a Response Surface Save/modify Module 305. A modular arrangement of the functionally related software within software system 300 enhances the overall flexibility and applicability of the software system to different environments by facilitating the use or omission of different Control Variable Modules (FIGS. 5A-5E) as desired or appropriate for a particular application and, moreover, facilitates the adding of new and different or updated Control-variable Modules.

Response surface initialization module 301 is basically responsible for accepting operator-inputted data describing operating conditions and constraints for a given reactor core (e.g., initial core loading, rod pattern, etc.) and creating a starting point or "center-point" simulation case for normalizing response surface 219. Control-variable modules 302 each contain program control steps for creating simulation case data for specific types of reactor core control-variables such as, for example, fuel bundle loading, control rod position, core flow, sequence change locations, bundle characteristics, etc. For each design input (independent control-variable) type, there may be many operational output (independent variable) cases to consider. Furthermore, for each independent variable case considered by a particular control-variable module there are at least two core simulations run from which response data is obtained: one simulation is performed using the center-point simulation case values with the independent control-variable value increased by a predetermined amount and another simulation is performed using the center-point simulation case values with the independent control-variable value decreased by a predetermined amount. The difference between the increased and decreased simulation input values for a particular control-variable or design input is referred to as the range or "breadth" of the control-variable and, since all simulation case results are stored in the response surface, it is also referred to herein as the "breadth" of the response surface (with respect to that control-variable). Each simulation case result includes the values for all of the operational performance parameters (dependent variables) modeled within the core simulation process. Ultimately, the response surface contains at least three core simulation case results for each independent variable case: the center-point case response and two variation case responses created by the particular control-variable module.

Control-variable modules 302 are preferably executed sequentially using a single computer/processor 10 in the LAN. Additional control-variable modules (not shown here) crafted toward particular reactor plant-specific considerations may also be used. The control-variable modules 302 may be executed in any order and any single one or several control-variable modules may be used (as indicated by the dotted lines in FIG. 3) depending on the various critical-to-quality considerations and degree of improvement to reactor performance that may be desired. Simulator input data files containing control-variable values are created by each control-variable module and submitted to other computers/processors in the LAN (or remote network 21) that have resident core simulator programs. Once a simulation case is completed by a processor, it creates a simulator output data file containing the resultant values and sends the file to the computer maintaining the response surface. Since reactor core simulations are typically very time consuming, this distributed processing arrangement allows many different core simulation cases to proceed more or less contemporaneously, thereby greatly reducing the overall elapsed time expended on core simulations.

Alternatively, different control-variable modules could also be resident on different independent computers connected within a LAN, WAN or via other communications links. For example, in such an embodiment, response surface initialization module 301 residing on one computer would place a request over the LAN for the execution of a particular desired control-variable module to another computer on which that module resides and then would forward the center-point case data from the response surface.

Polynomial coefficient development module 303 contains program control code for mapping the core simulation results for each independent variable case to unique second-order polynomial curves corresponding to each performance parameter (i.e., the operational "dependent" variables). The coefficient values of each polynomial are determined such that each polynomial fits the data from the three simulation cases for its corresponding performance parameter. Polynomial usage module 304 contains program control code for exploring changes to values of each control-variable, as well as changes to combinations of control-variables considered together, and determining which changes produce the greatest impact on core performance. Since running a core simulation is time consuming, the polynomials are used as fast predictors (relative to the 3-D simulator execution) to determine performance parameter values over the input breadth of a control-variable in lieu of running a core simulation. The control-variable(s) having the greatest performance impact are determined by reiteratively comparing predicted performance parameter values using a predetermined objective function. Finally, a Save/modify module 305 contains program control code for saving and documenting the response surface and outputting quantified optimum control-variable operational values or, alternatively, modifying the response surface if it is determined that results can be further improved by reducing the "breadth" of the response surface (explained in greater detail below).

Figure 4:
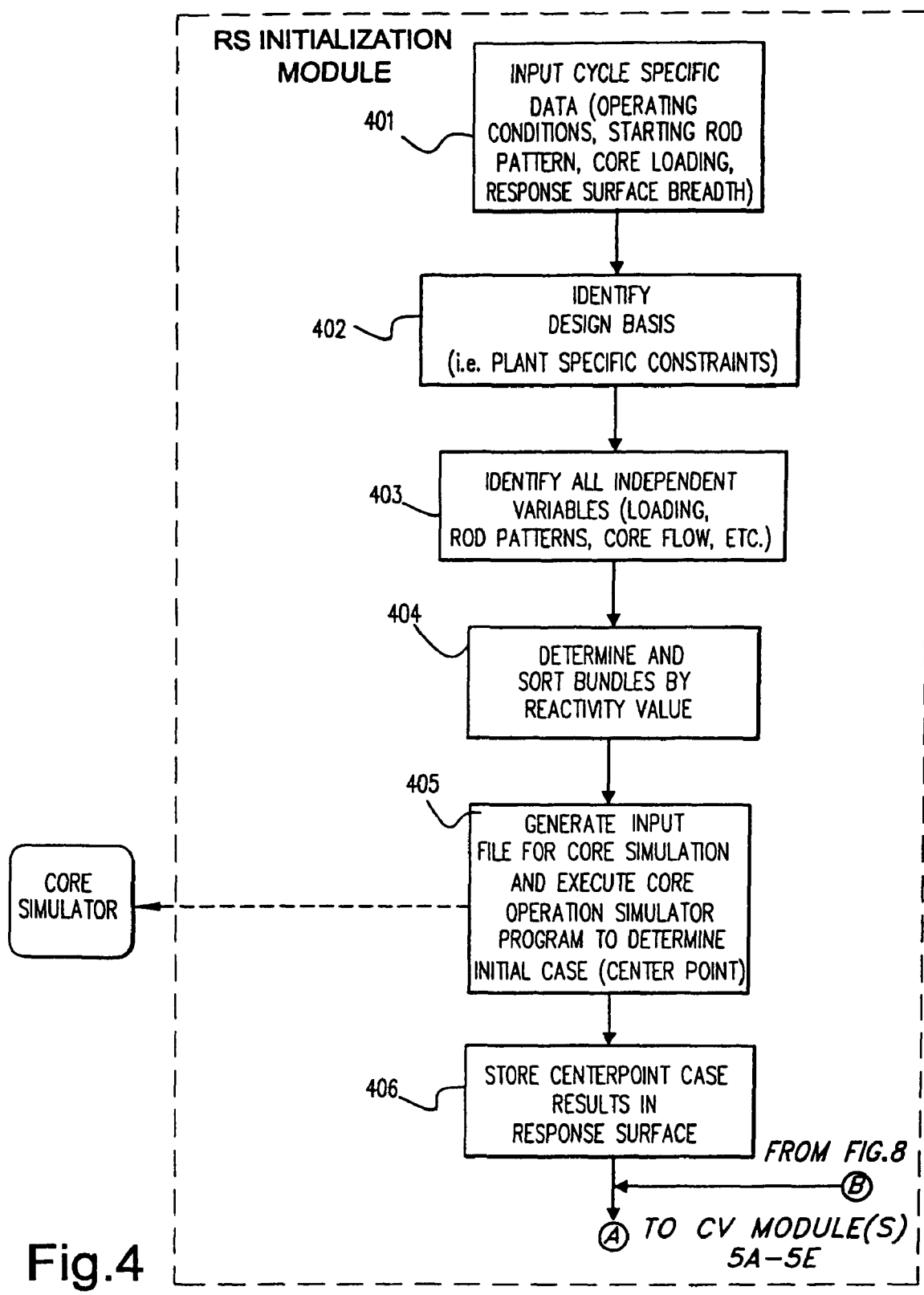
FIG. 4 is a flowchart illustrating exemplary functional program control steps performed by a response surface initialization module.

Referring now to FIG. 4, a flow chart illustrates example functional steps performed by response surface initialization module 301. The first few initial steps 401-404 basically acquire and identify information needed to create an initial center-point simulation case. At step 401, cycle specific reactor core operating condition data including initial values for control variables (i.e., initial control rod pattern, initial core loading arrangement, etc.) and an initial response surface breadth is specified via operator-input. At step 402, specific operational constraints, which form the design basis, of a particular reactor plant are identified from the acquired operator-input information—such design basis and constraint information aids in the evaluation of an "objective function", discussed below, that is used to compare the relative quality of alternative solutions. In addition, the computer operator may select an input option, discussed in greater detail below with respect to the Polynomial Optimization And Evaluation Module and FIG. 7, that permits the effects on reactor performance of a change in the operational value of two or more control-variables to be considered in combination.

At step 403, the particular independent control-variables (core loading, rod pattern, core flow, sequence exchange, bundle characteristics, etc.) that are to be considered during the optimization are identified based on the acquired operator-input information. At step 404, the fuel bundles to be used within the core are identified and sorted according to reactivity value. Next, at step 405, a core simulation input data file for producing a center-point simulation case is generated and submitted to a resident (or remote) core simulation program. Once the simulation is finished, the results of the simulation are returned in a simulation output file. At step 406, a multi-dimensional array is created in memory as a simulation "response surface" and data from the simulation output file is stored there as an initial center-point case.

Next, one or more control-variable modules 302 are executed to develop simulation case data for variations in values for specific control—variables. The execution of more than one control-variable module is optional. As will be readily apparent from this disclosure, additional control-variable specific modules (not disclosed herein) may also be included as desired. As previously mentioned, the individual control-variable modules may be executed sequentially by a single processor or run contemporaneously on different computers within the LAN or WAN. As the execution of each control-variable module results in adding more simulation case data to the response surface, the accuracy of the present method and the potential reactor performance optimization achievable is correspondingly enhanced.

Figure 5A:
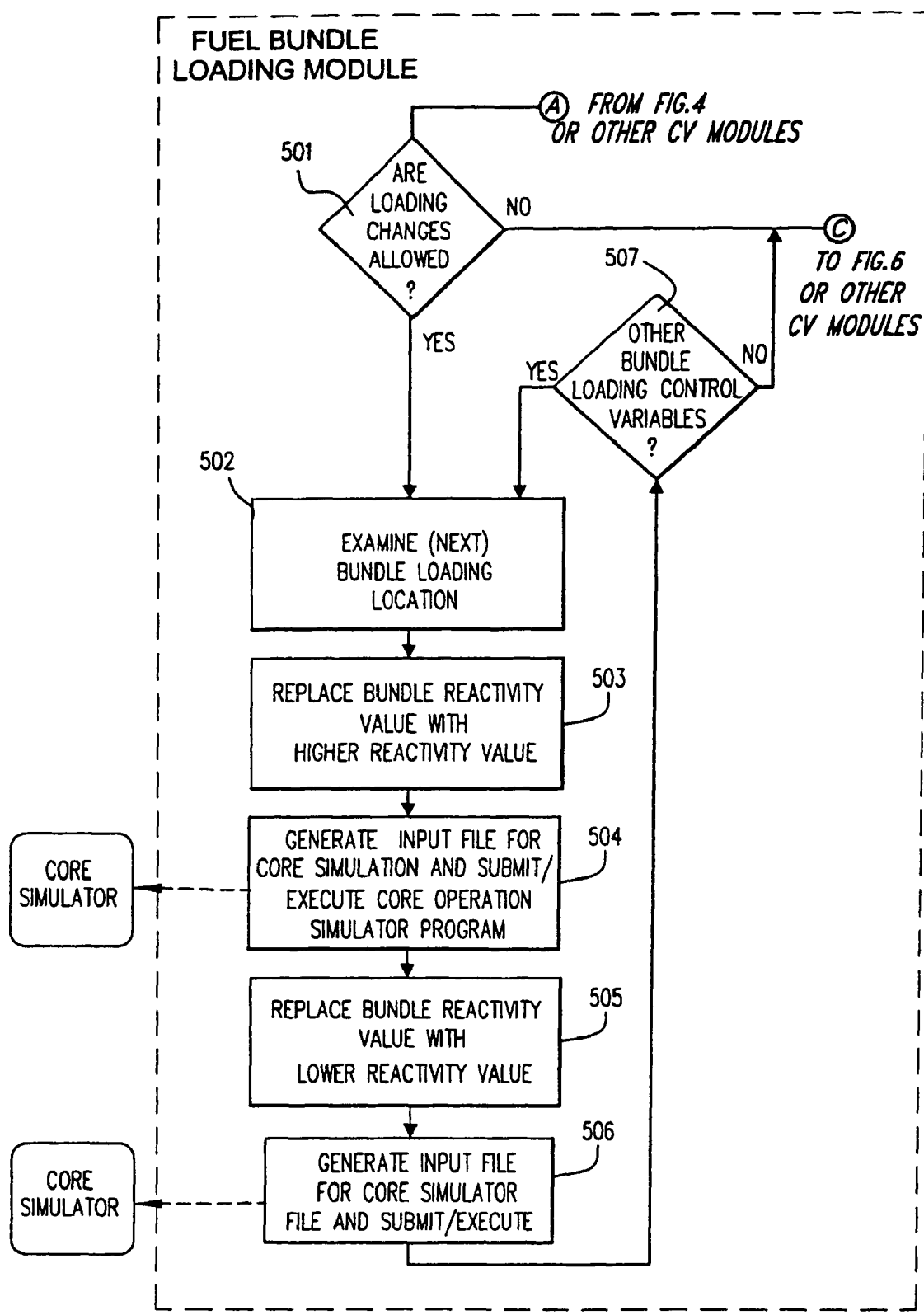
FIG. 5A is a flowchart illustrating functional program control steps performed by a fuel bundle loading module.

Referring to FIG. 5A, the functional steps performed by an example control-variable module for fuel bundle loading are discussed first. The fuel bundle loading module examines changes in reactor performance parameters caused by changes in the fuel bundle position or loading arrangement. Conventionally, most reactor cores are octant-symmetric and, consequently, only bundle arrangements within one octant of the core need to be considered. However, octant symmetry is not a requirement of the process. As indicated at step 501, it is first determined if fuel bundle loading changes are allowed given the pre-identified constraints for the particular reactor. If bundle loading changes are not allowed, program control is passed to another module. If bundle loading changes are allowed, all permissible bundle locations are systematically considered by repeating steps 503 through 507 for each different location, as indicated by block 502.

At step 503, the known reactivity value of the bundle at the selected location is changed to a predetermined higher value. A new core simulation input file is then generated—the input file reflecting the change in fuel bundle reactivity value and a shuffling of the remaining fuel to minimize any reactivity differences relative to the center point. This shuffling of the remaining fuel is readily accomplished by referring to the previously sorted list generated by step 404, whereby bundle rank positions in the sorted list are shifted by one position in a 'cascade' strategy. For example, a location that is changed from reactivity rank 10 in the sorted list to rank 5 will have the effect of changing rank 5 to 6, rank 6 to 7, and so forth up until rank 9 to 10. The core simulation input file is then submitted to an available processor/computer for simulation processing, as indicated at step 504. (Although core simulation input files reflecting a "rodded depletion" are generally intended, non-rodded depletion type simulator input files could also be used with this method.) Without waiting for the results of the submitted core simulation, the bundle reactivity value for the same location is changed, at step 505, to a value lower than the original reactivity. The combined amount of increase and decrease exacted to the value for a particular control-variable, as described herein with respect to the various control-variable modules, is predetermined according to the particular control-variable being considered and defines the range or "breadth" of values for which the control-variable is examined.

Next, at step 506, a new core simulation input file having the changed reactivity value is again generated and submitted to any available processor/computer 10 for processing another simulation. In one operational example, once the simulation cases in steps 504 and 506 are completed, output data parameters from each simulation can be normalized to the center point, fit to polynomials and stored to common response surface 219, for example, by each processor/computer performing the core simulation. If changes in reactivity values for fuel bundles at other locations have not yet been simulated, without necessarily waiting for the core simulations of previous steps to complete, a new bundle location is selected and steps 503-506 are again repeated until all allowable bundle locations have been considered, as indicated at step 507. Ultimately, once all the independent control-variable cases for fuel bundle reactivity variations have been considered, processing may continue under control of another module.

Figure 5B:
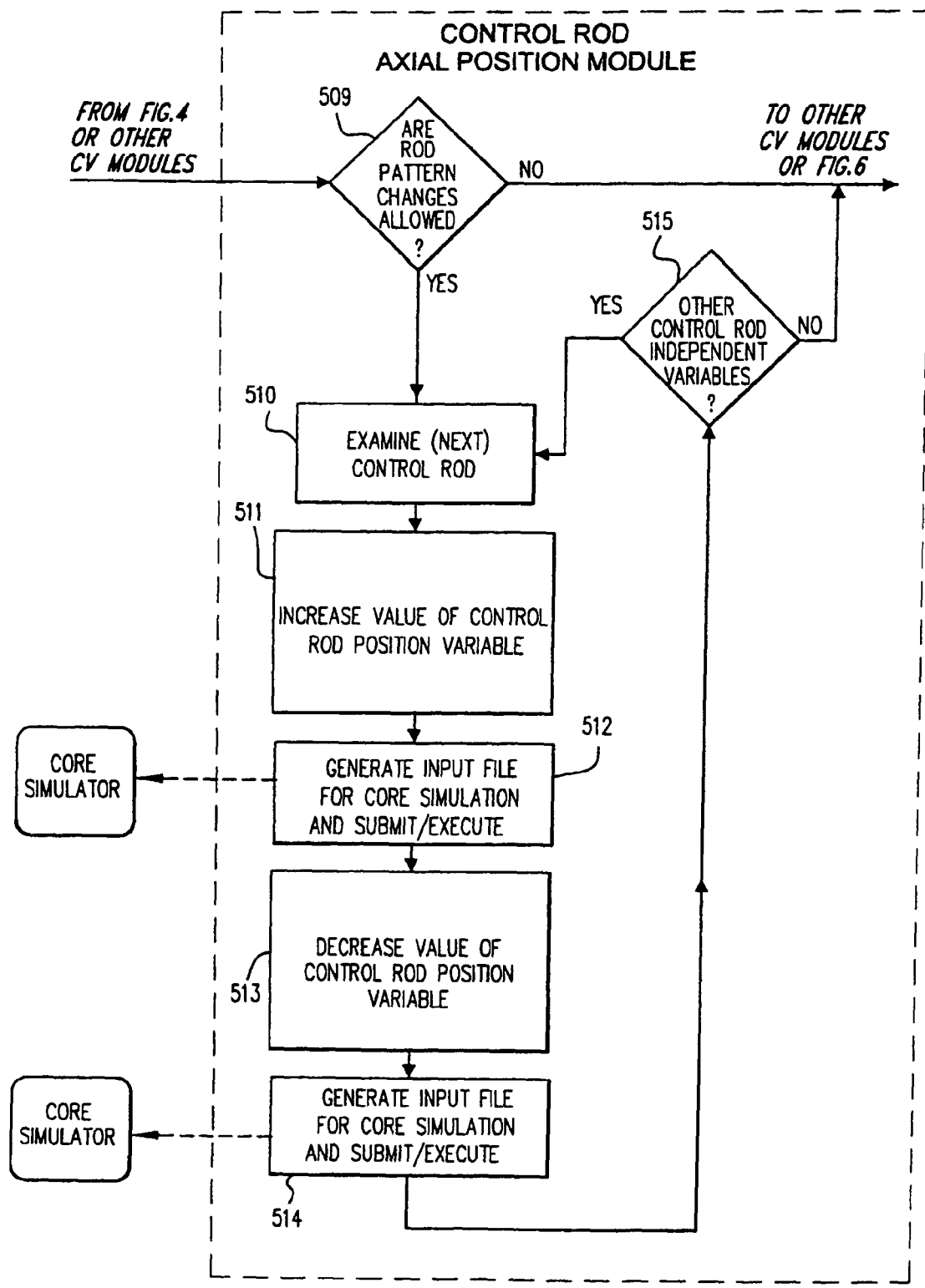
FIG. 5B is a flowchart illustrating exemplary functional program control steps performed by a control rod axial positioning module.

FIG. 5B shows program control steps performed by an example control-variable module for the exploring the different axial positions of the control rods or blades. In a manner similar to the fuel bundle loading module of FIG. 5A, two simulation cases for each control rod are developed and the simulation results are added to the common response surface. At step 509, it is first determined if control rod pattern changes are allowed given the pre-identified constraints for the reactor. If control rod pattern changes are not allowed, program control is passed to another module. If control rod changes are allowed, a predetermined control rod is selected for analysis, as indicated at step 510. Next, at step 511, the initial position value of the selected control rod is increased by a predetermined amount such that the amount of the increase does not violate the physical boundaries of the core or the specified user limits. A new core simulation input file, having only the selected control rod position value changed, is then generated and submitted to an available processor/computer 10 for simulation processing, as indicated at step 512.

At step 513, the control rod position value for the same control rod is changed to a value less than the original position as was done in step 511. Next at step 514, a new core simulation input file having the changed position value is again generated and submitted to an available processor/computer 10 for processing a second simulation case. As indicated at step 515, if changes in position values for other control rods are to be simulated, a new control rod is selected and steps 511-514 are again repeated until all control rods have been considered. As with the fuel bundle loading module, each step in the control rod positioning module may proceed without necessarily waiting for the core simulations of previous steps to complete. Finally, once all the independent control-variable cases for control rod position variations have been considered, processing may continue under control of another module.

Figure 5C:
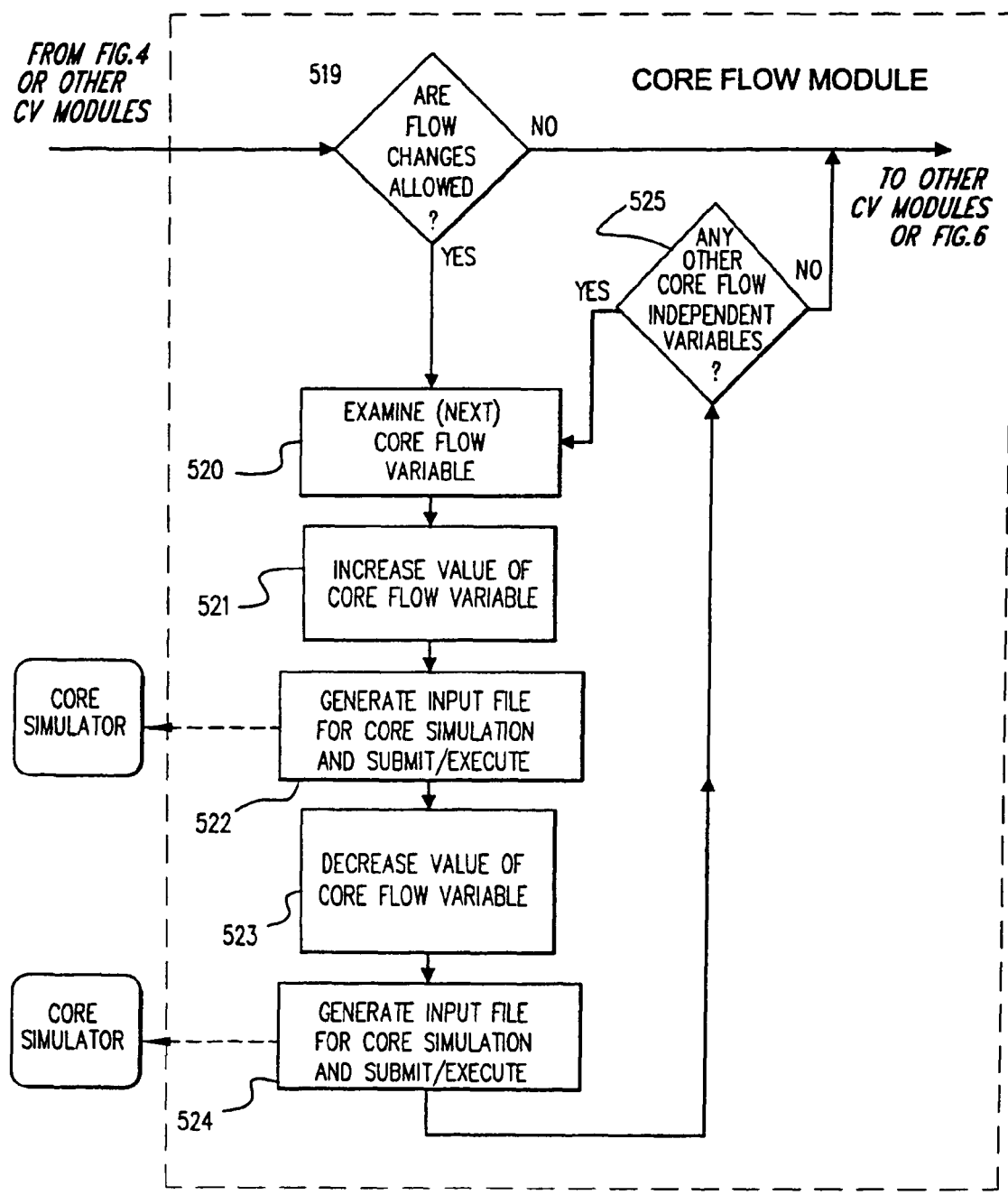
FIG. 5C is a flowchart illustrating exemplary functional program control steps performed by a core flow module.

FIG. 5C shows program control steps performed by an example control-variable module for developing the response surface from changes in the core flow. In a manner similar to the other independent control-variable modules of FIGS. 5A and 5B, two simulation cases for each core flow control-variable are developed and added to the common response surface. At step 519, it is first determined if core flow changes are allowed given the pre-identified constraints for the reactor. If core flow changes are not allowed, program control is passed to another module. If core flow changes are allowed, a particular core flow variable is selected for analysis, as indicated at step 520. Next, at step 521, the initial center-point case value of the selected core flow variable is increased by a predetermined amount. A new core simulation input file, having only the selected core flow variable value changed, is then generated and submitted to an available processor/computer 10 for simulation processing, as indicated at step 522.

At step 523, the core flow value for the same core flow variable is changed to a value less than the original value similar to step 521. Next at step 524, a new core simulation input file having the changes core flow value is again generated and submitted to an available processor/computer for processing a second simulation case. As indicated at step 525, if changes in core flow values for other core flow variables have not yet been simulated, the next independent core flow variable is selected and steps 521-524 are again repeated until all independent core flow variables have been considered. As with the other control-variable modules discussed above, each step in this module may proceed without necessarily waiting for the core simulations of previous steps to complete. Finally, once all the independent control-variable cases for core flow variables have been considered, processing may continue under control of another module.

Figure 5D:
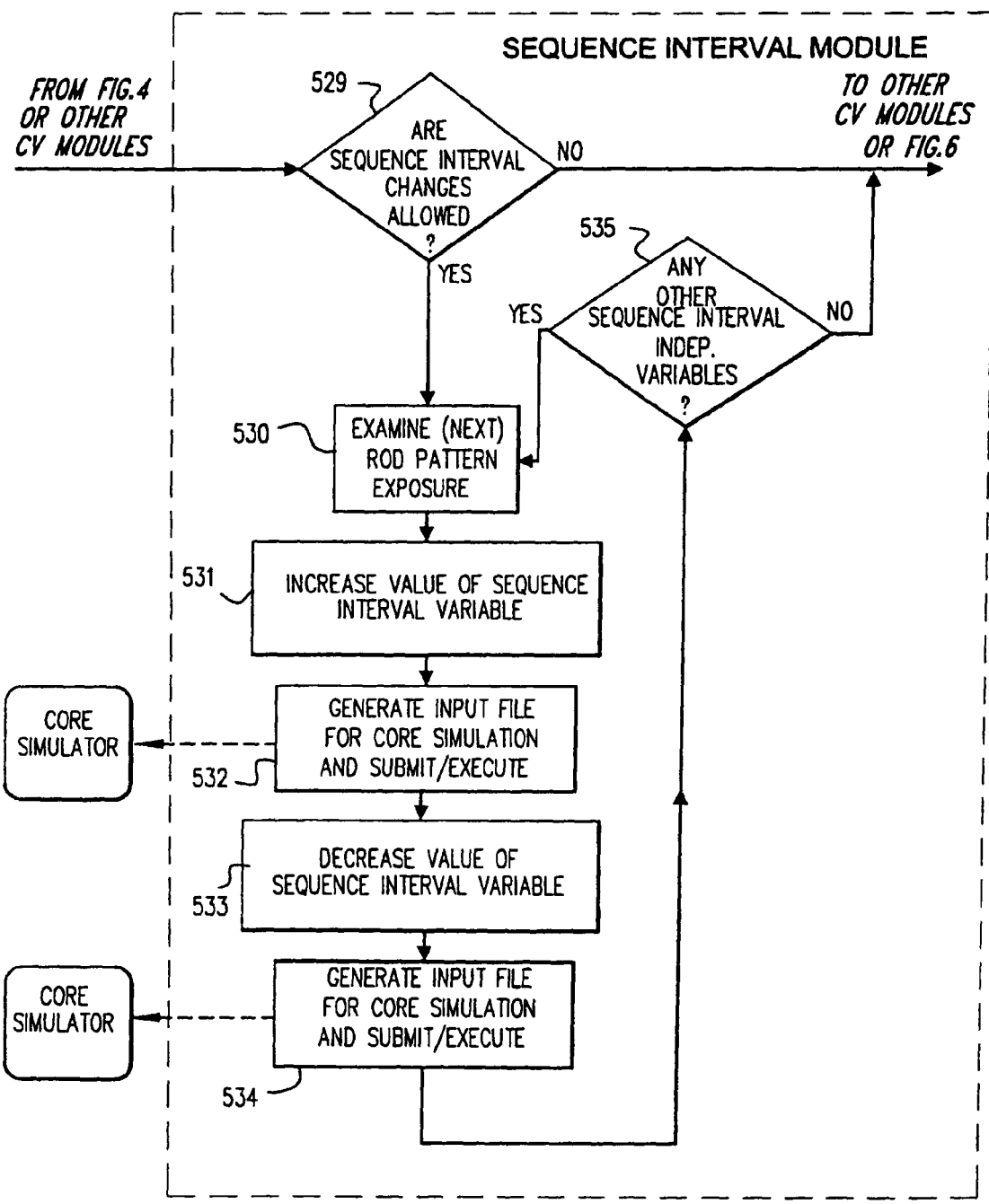
FIG. 5D is a flowchart illustrating exemplary functional program control steps performed by a sequence interval module.

FIG. 5D shows program control steps performed by an example control-variable module for developing the response surface from changes in sequence interval. In a manner similar to the other control-variable modules, two simulation cases for each control blade sequence interval occurring during the operational cycle are developed and added to the common response surface 219. At step 529, it is first determined if sequence interval changes are allowed given the pre-identified constraints for the reactor. If changes are not allowed, program control is passed to another module. If changes are allowed, a particular sequence interval is selected for analysis, as indicated at step 530. Next, at step 531, the initial center-point case sequence interval value for the selected sequence interval is increased by a user specified amount. A new core simulation input file, having only the selected sequence interval value changed, is then generated and submitted to an available processor/computer 10 for simulation processing, as indicated at step 532.

At step 533, the sequence interval value for the same control blade sequence interval is changed to a value less than the original value similar to 531. Next at step 534, a new core simulation input file having the changed position value is again generated and submitted to an available processor/computer for processing a second simulation case. As indicated at step 535, if changes in values for other sequence interval variables have not yet been simulated, a new bundle is selected and steps 531-534 are again repeated until all other relevant independent sequence interval variables have been considered. As with the other control-variable modules, each step in this module may proceed without necessarily waiting for the core simulations of previous steps to complete. Finally, once all the independent control-variable cases for the sequence interval variables have been considered, processing may continue under control of another module.

Although the modules depicted in FIGS. 5A through 5D together demonstrate the ability of the optimization method to consider independent control-variables that are capable of having values that are considered as "continuous" in nature, such as, for example, loading parameters, rod pattern parameters, flow parameters, and sequence exchange parameters, etc., the method can also be used to consider changes in "discrete" value control-variables, such as bundle characteristics. An example control-variable (CV) module for considering discrete-value type control-variables is provided using the context of fuel bundle characteristics is illustrated in FIG. 5E.

Figure 5E:
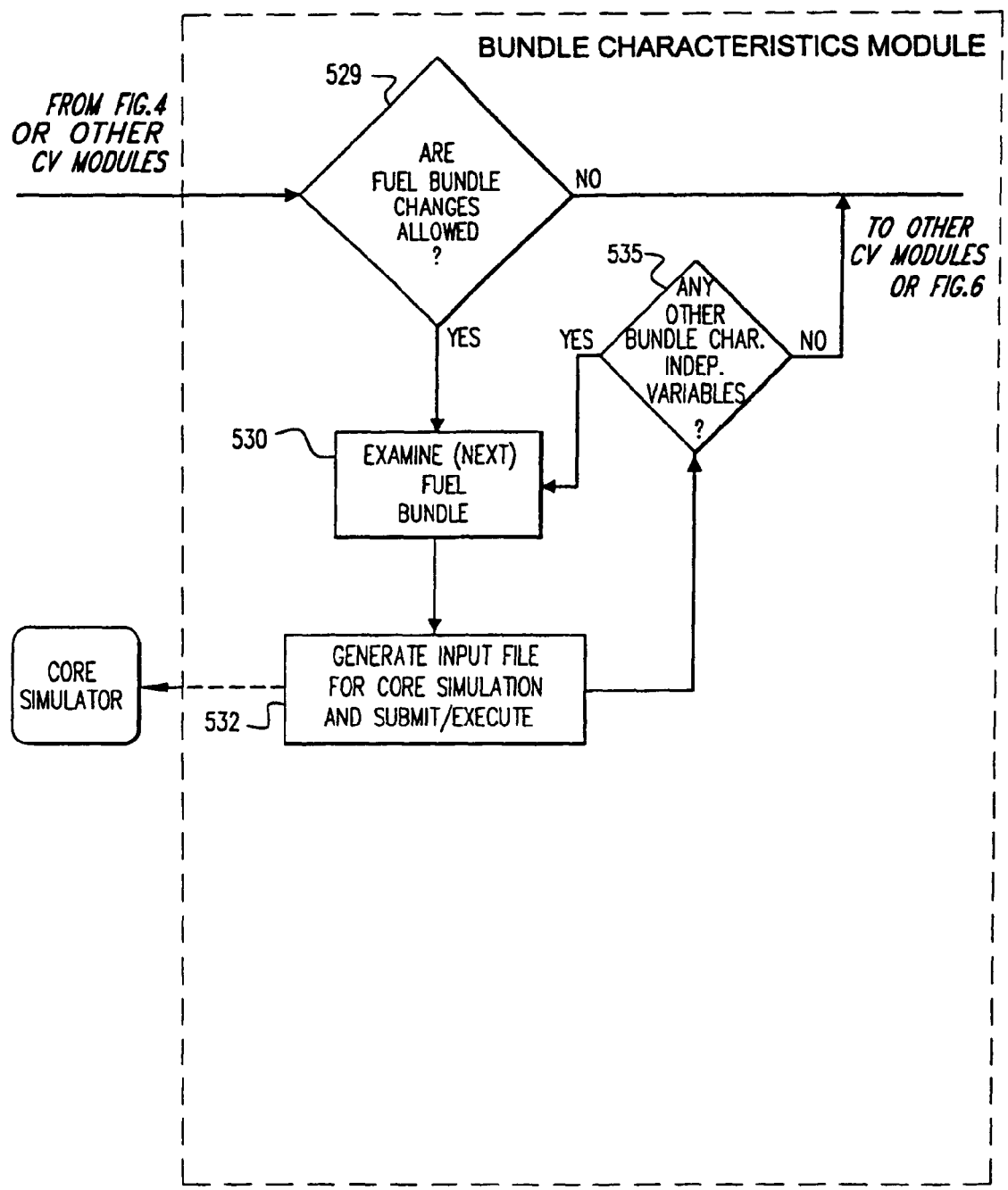
FIG. 5E is a flowchart illustrating exemplary functional program control steps performed by an fuel bundle characteristics module.

Referring now to FIG. 5E, example program control steps for developing reactor simulation response data from changes in bundle characteristics are described. Fuel bundle characteristics, in this example, can represent any fuel bundle having differences in fuel rod configurations such as that due to radial and/or axial Uranium 235 enrichment variation and/or radial and/or axial Gadolinium variation. Like the previously discussed modules, core simulator cases are generated and executed for each independent control variable. Upon completion of each fuel bundle characteristics independent control-variable, the dependent variable output information is normalized to the relative centerpoint. However, instead of mapping the response to polynomials, the response is mapped to linear functions. Once all control variable modules 302 and corresponding simulation cases have finished execution and the simulation results normalized to the relative center-point, then the simulation case data is mapped to either polynomials and/or linear functions and the results are stored in the response surface 219.

Figure 6:
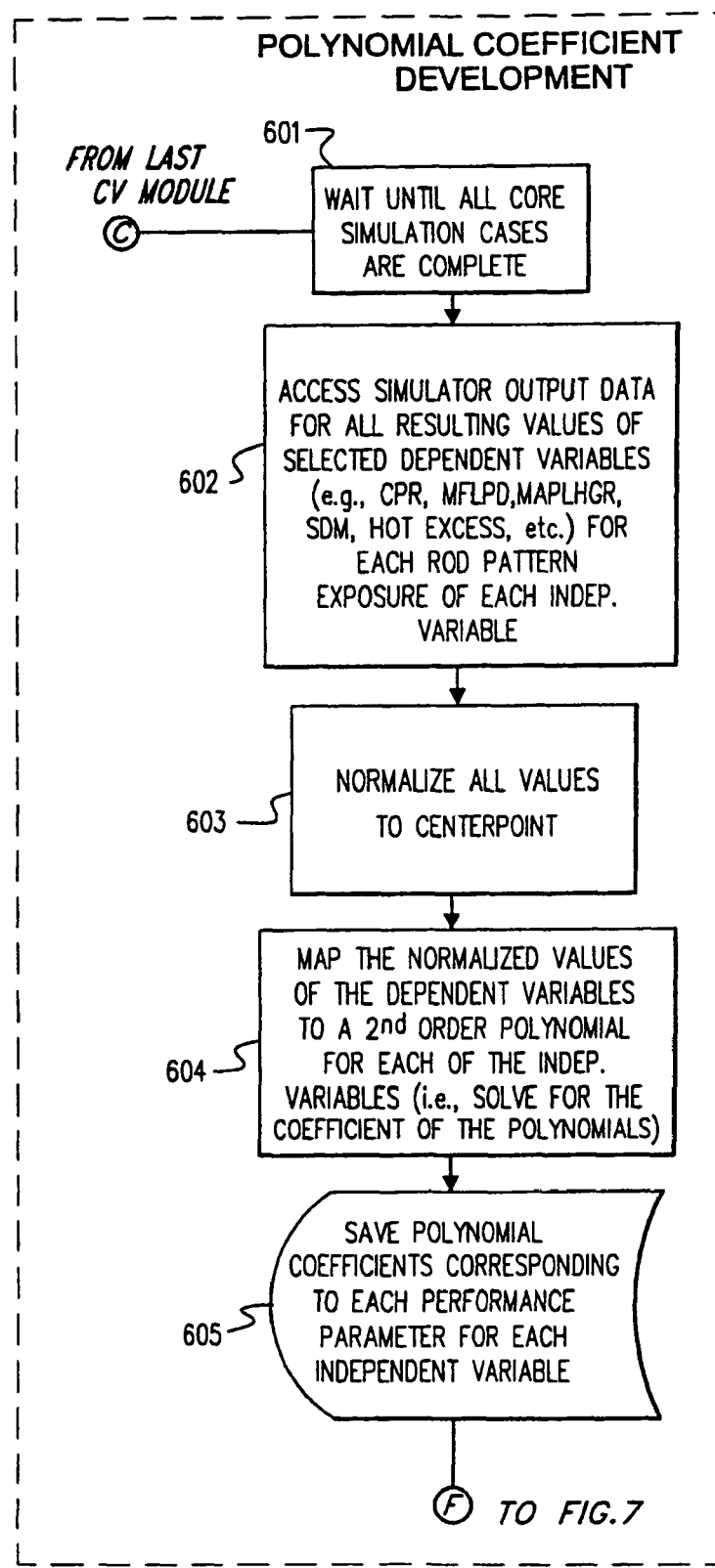
FIG. 6 is a flowchart illustrating exemplary functional program control steps performed by an polynomial coefficient development module.

FIG. 6 shows example functional program control steps for developing polynomial coefficients for mapping each simulation case to a polynomial that fits the three data values for each independent variable case (i.e., the upper, lower and center-point values). At functional step 601, further processing is delayed until all of the simulation cases are complete and the response surface has been updated. Next, at steps 602 and 603, the response surface is accessed and all the simulation data produced by control variable modules 302 is normalized to the center-point case data. Next, at functional step 604, coefficients are determined for defining a unique second order polynomial that fits the three normalized simulation case values for each independent control-variable. However, since the evaluation of certain control-variables (for example, fuel bundle rod configuration) can only be evaluated as discrete changes, core simulation results for these type of variables are stored in the response surface as discrete first order evaluations and are not mapped to polynomials. Finally, at step 605, the coefficients for each polynomial are saved and further processing continues with the polynomial optimization and evaluation module.

Figure 7:
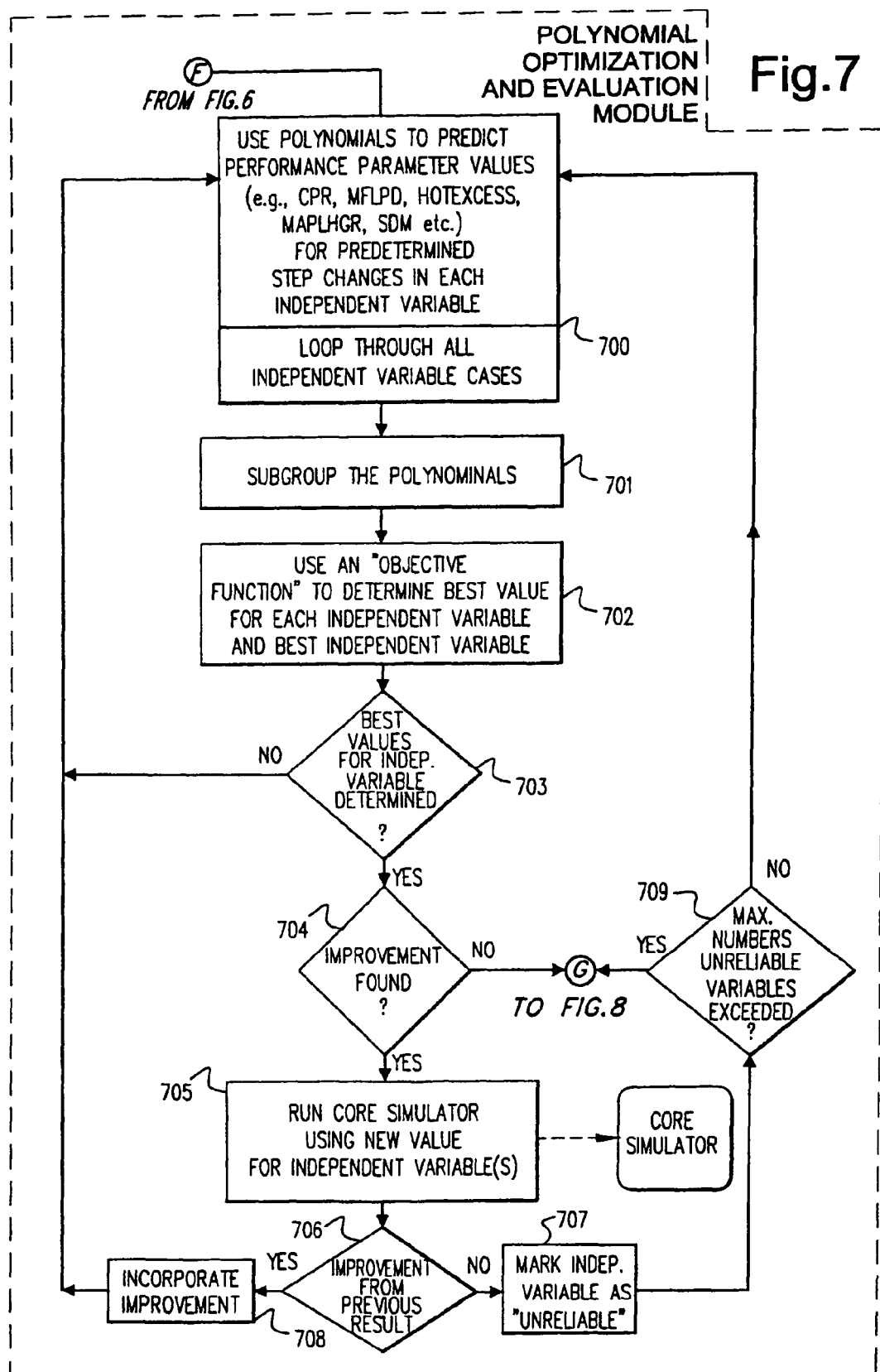
FIG. 7 is a flowchart illustrating exemplary functional program control steps performed by an polynomial usage module.

FIG. 7 shows example functional program control steps for polynomial optimization and evaluation module 304. This module examines reactor performance parameter values predicted by each of the second-order polynomials associated with each control-variable to determine which control variable and value produces the most significant improvement in reactor performance. At steps 700 and 701, polynomials developed from each of the control-variable simulation cases are accessed from the response surface, sub-grouped and used to predict quantitative values for performance parameters (e.g., CPR, MFLPD, MAPLHGR, etc.) over the breadth of allowable values for that control-variable. In other words, a control-variable is selected and the polynomials associated with each of the performance parameters (i.e., operational outputs) as influenced by that control-variable are used to predict a set of performance parameter values indicative of reactor performance for each of a predetermined number of discrete incremental changes in the value of the selected control-variable over the breadth (i.e., range of predetermined permissible values) of the control-variable. This process is repeated for every independent control-variable.

Under a principle generally known in the art as "superposition", the net effect of a plurality of changes made to different control-variables together in combination can be determined by the summation of the effects of the individual control-variable changes made separately. Accordingly, at the initialization and input stage (i.e., when cycle specific inputs and design basis considerations are identified, e.g., as discussed above with respect to steps 401 and 402 of the Initialization Module in FIG. 4), a user of the present system may select an optimization "resolution" level as input option that permits changes to quantitative operational values for more than one independent variable to be evaluated in combination with each other. Consequently, if this option was previously selected, then, at step 700, the individual polynomial-predicted effects of every combination of a selected plurality of independent control-variables are summarily combined to quantitatively determine the net effect that a plurality of changes to different control-variables made together would have on each of the many reactor core performance parameters. The higher the selected resolution level, the more independent control-variables are evaluated together in combination and, hence, the greater the probability of detecting a combination that will improve reactor performance. For example, at a selected optimization resolution level of "three", a change in the quantitative values for three different independent control-variables and every combination of three control-variables out of the total number of control-variables considered would be evaluated. All discrete changes among the plurality of control-variables under a particular resolution are examined using the associated polynomial predictors for each control variable.

Although higher resolution levels may require somewhat longer processing times than lower resolution levels, the total processing time is significantly less than conventional methods because the polynomial predictors are used and combined accordingly instead of performing actual computer simulations of the reactor core for each case. In this manner, the method is essentially exhaustive and is almost guaranteed to identify the global optimum fuel-cycle design. While very high resolution levels may not be feasible in practice due to the extended processing time required, the capacity of this method to permit selection of a particular resolution level enables the system user to selectively quantify a degree of "closeness" to the true absolute optimum which is desired to be achieved.

Next, at step 702, for each quantitative value change made to a individual control-variable or combination of control-variables (i.e., the design inputs), an "objective function" test is used to quantify the relative "worth" or "strength" of that change in terms of its effect on improving the performance parameters (i.e., the "dependent" variables). The objective function sets a particular limiting value for each performance parameter that is determined primarily through an integration of performance "violations" relative to defined design limits, offset by the integration of any performance "credits" associated with beneficial results such as additional energy, increased thermal margin, etc. Pre-determined multipliers (i.e., mathematical factors) are applied to design limit values for each of the performance parameters-such as, for example, Hot Excess, MFLPD, MAPLHGR, etc.—to provide normalization and relative ranking of each parameter. Basically, in step 702, each predicted performance parameter value is tested using an objective function, fashioned in accordance with conventional knowledge and practice in the art, to determine the best set of control-variable polynomial predictors for optimizing core performance. At step 703, the best values for the control-variables are identified. Since each polynomial predictor corresponds to a specific control-variable, polynomial predictors are compared, as rated by the objective function of step 702, and reiteration of steps 700-702 continues until the best values for the control-variables have been identified. Next, at step 704, the control-variable values are compared with the values obtained from previous iterations (if any) to determine if any improvement is found to exist (i.e., improvement in the figure of merit provided by the objective function). If no improvement is detected, processing continues with the steps shown in FIG. 8. If some improvement is found to exist, a core simulator input case is prepared using the improved values from the selected best polynomial predictor(s) corresponding to one or more control-variables and a core simulation is executed, as indicated at step 705.

Although the use of polynomials allows for a rapid prediction of what changes may constitute an improvement in reactor performance, the core simulation at step 705 provides calibration between the simulation process and the polynomial coefficient data in the response surface. Essentially, it allows for verifying the predicted improvement by providing "actual" (as opposed to "predicted") core simulation data documenting the operation of the core under the improved control-variables. At step 706, the core simulation results of step 705 are compared with the core simulation results from the center-point case (or the results of previous optimizations) to determine if any improvement to core performance has resulted. If the results from the step 705 core simulation show an improvement over the center-point case, the improvement is incorporated and the process is repeated again, as indicated at step 708. If the results of the core simulation at step 705 have not improved, the corresponding control-variable(s) is considered as "unreliable" and marked as such at step 707. Namely, in step 707 the corresponding control-variable values will not be considered as a potential solution. Once a predetermined number of unreliable control-variables is exceeded, as tested at step 709, polynomial optimization and evaluation ceases and processing continues with the steps shown in FIG. 8.

Figure 8:
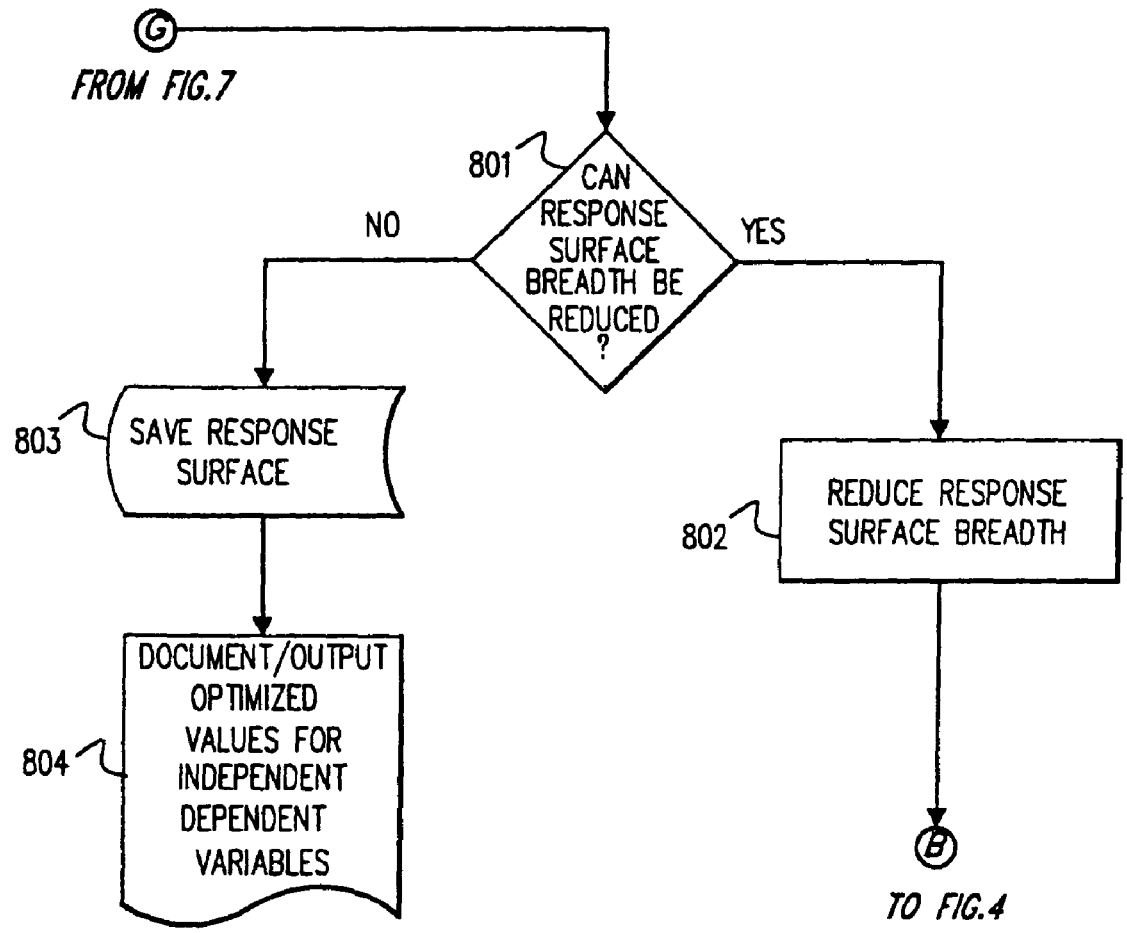
FIG. 8 is a flowchart illustrating exemplary functional program control steps for saving and modifying response surface results.

FIG. 8 shows example functional program control steps for Save/modify Response Surface Module 305. First, the current "breadth" of the response surface is examined at step 801 (i.e., the breadth of the response surface in terms of the range of control-variable values explored). If a reduction in the predetermined range of values used by the CV modules in creating simulation cases for the control-variables is feasible, then that range is decreased and the creation of a new response surface is initiated using the original center-point case data. This is indicated at functional step 802 as reducing the response surface breadth. At this point, the optimization process starts over again creating this "new" response surface using one or more of the various control-variable modules, as indicated by entry point "B" in FIG. 4. If reducing the "breadth" of control-variable values used by the CV modules is not feasible, the current response surface data is documented (saved) and the optimized control-variable values are output, as indicated by steps 803 and 804.

Predicted Reactor Core Simulation

Figure 9:
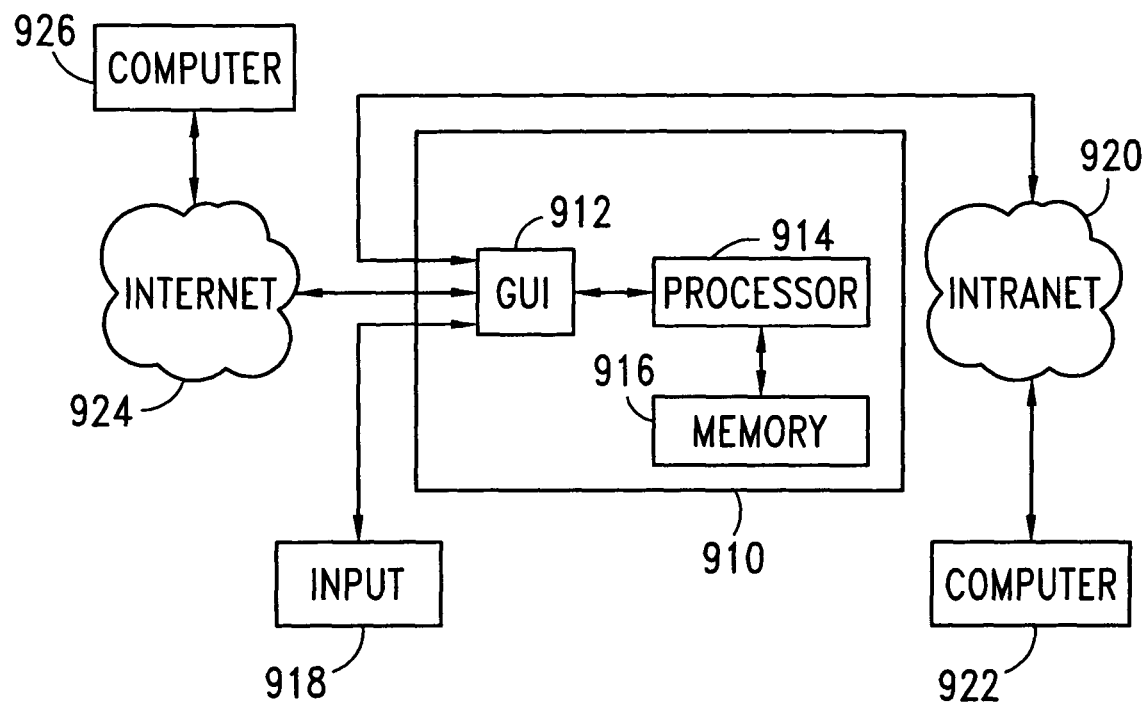
FIG. 9 illustrates a block diagram of an exemplary system employing the method of predicted reactor core simulation according to the present invention.

FIG. 9 illustrates a block diagram of an exemplary system employing the method of predicted reactor core simulation according to the present invention. As shown, a server 910 includes a graphical user interface 912 connected to a processor 914. The processor 914 is connected to a memory 916, which stores one or more response surfaces among other things. The server 910 is directly accessible by a user input device 918 (e.g., a display, keyboard and mouse). The server 910 is also accessible by computers 922 and 926 over an intranet 920 and the Internet 924, respectively.

A system user accesses the system directly, over the intranet 920 or over the internet 924 using one of the input 918, the computer 922 and the computer 926. When the user accesses the system, the processor 914 via the GUI 912 provides the user with the option of using a predicted reactor simulation tool executable by the processor 914. If the user selects to use this tool, the operation shown in FIG. 10 is performed.

Figure 10:
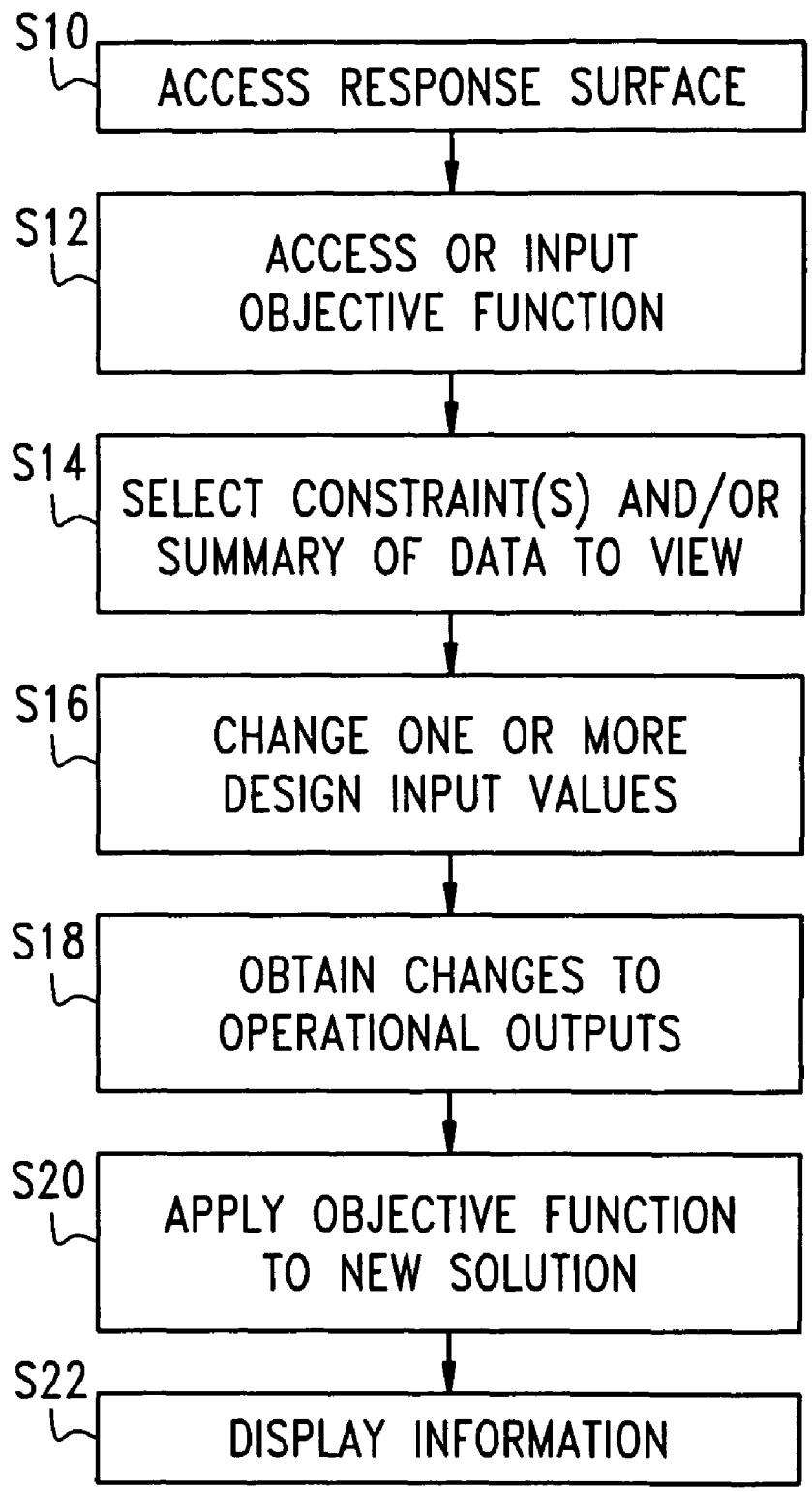
FIG. 10 illustrates a flow chart of the method of predicted reactor core simulation according to an exemplary embodiment of the present invention.

FIG. 10 illustrates a flow chart of the method of predicted reactor core simulation according to an exemplary embodiment of the present invention. As shown, using the predicted reactor simulation tool, the user accesses a response surface stored in the memory 916 and any associated information in step S10. For example, in step S10, the data accessed as part of the response surface may include: 1) the set of independent control variables (i.e. control rods, fuel bundles, exposure steps, etc.) perturbed in the creation of the response surface; 2) the breadth or range over which each independent control variable was perturbed in the creation of the response surface; 3) the center-point solution corresponding to the 'null' perturbation response surface prediction; and 4) the set of response surface polynomial coefficients. As will be appreciated, the memory 916 may store a plurality of response surfaces for one or more reactor cores.

In step S12, the user may also access the objective function, along with the corresponding problem constraints and weights comprising the objective function, used in conjunction with the accessed response surface to generate a core design. In addition or alternatively, the user may input revised problem constraints and weights thus providing a 'new' objective function.

After the user accesses the response surface and optionally, the objective function, in step S14 the user selects one or more design inputs, one or more operational outputs, one or more constraints on the design inputs and/or outputs, and/or a predetermined format of a summary of this information to be displayed. It will be appreciated that the present invention is not limited to these display options and the numerous other display options are possible.

In step S16, the user changes one or more design input values and/or constraints on design inputs. Next, the user requests the processor 914 to generate new operational outputs using the modified design input(s) and/or constraint(s) in step S18. The generation of operational output values using the response surface was discussed in detail above regarding generating the response surface, and is not repeated here. Because the response surface generates the operational output results using the relatively simple polynomials represented by the response surface, the operational output values are generated in real time. This is contrasted with the relatively lengthy process taken by conventional reactor simulators to generate operational output values.

In step S20, the user indicates the objection function to apply to the original solution represented by the selected response surface and the new solution represented by the results of step S18. The user may select to use the objective function used in generating the selected response surface on both the original and new solution. Alternatively, the user may select to use a newly input objective function (see step S12) on both the original and new solution. As a further alternative, the user may specify using one objective function on the original solution and a different objective function on the new solution.

Subsequently in step S22, user indicates the manner in which to supply the information generated by the predicted reactor simulation. For example, the user may instruct the processor 914 to display a worst case value for one or more operational outputs; display figures of merit (e.g., objective function values) for the original solution and/or new solution based on the selections made in step S20; display the information generated in step S18 and supplied in step S16 in a predetermined format; and/or a combination of the above. All output results from the predicted reactor simulation may be displayed graphically and may include: 1) scalar plots versus time; 2) one-dimensional axial plots versus time; 3) two-dimensional core radial maps versus time; 4) three-dimensional core maps by axial cutting plane versus time; and 5) three-dimensional core view versus time.

As will be appreciated, the method of predicted reactor simulation provides for using the response surface generated for a reactor core as a type of cyber-workspace to test possible changes to the design. Furthermore, the predicted reactor simulation results are generated in real time making this a feasible option for quickly testing theories or just experimenting with design changes.

The technical effect of the invention is a computer system that provides for generating real time predicted reactor simulation results.

The invention being thus described, it will be obvious that the same may be varied in many ways. For instance, while the present invention has been described as applied to a boiling water reactor design, the present invention is equally applicable to pressure water reactors. Such variations are not to be regarded as a departure from the spirit and scope of the invention, and all such modifications as would be obvious to one skilled in the art are intended to be included within the scope of the following claims.

We claim:

1. A method for reactor simulation, comprising:
receiving, with a computer processor, user input including values of one or more design input variables previously used in creating an existing response surface, the response surface defining relationships between the design inputs and operational outputs of at least one or more aspects of a core design; and
generating, with the computer processor, a reactor simulation based on the existing response surface for the core design and the received user input.

2. The method of claim 1, further comprising:
accessing the existing response surface for the core design from a database.

3. The method of claim 1, wherein the user input includes at least one of control blades positions over time, bundle types of fresh fuel, loading pattern of exposed fuel, and water flow through the reactor core.

4. The method of claim 1, wherein the operational outputs include at least one of critical power ratio (CPR), shutdown margin (SDM), maximum average planar linear heat generation rate (MAPLHGR), maximum fraction of linear power density (MFLPD), hot excess reactivity, radial and axial power peaking, peak fuel rod and bundle exposure, Uranium utilization as measured by reactor energy output produced (in mega-watt-days) per kilogram of Uranium-235 loaded.

5. The method of claim 1, wherein the generating step generates the reactor simulation in real time.

6. The method of claim 1, wherein the existing response surface includes information defining a plurality of predictors, each predictor predicting one of the operational outputs based on one of the design inputs.

7. The method of claim 6, wherein the generating step uses one or more predictors associated with the user input to generate new operational outputs.

8. The method of claim 6, wherein each predictor is one of a second order polynomial and a linear function.

9. The method of claim 1, further comprising: providing feedback to the user on the generated reactor simulation.

10. The method of claim 9, wherein the providing step provides an old objective function value for the core design prior to receiving user input and a new objective function value for the core design after receiving user input.

11. The method of claim 10, wherein a same objective function is used to determine the old and new objective function values.

12. The method of claim 11, wherein the same objective function is the objective function used to create the core design.

13. The method of claim 11, wherein the same objective function is a different objective function than an objective function used to create the core design.

14. The method of claim 10, wherein different objective functions are used to determine the old and new object function values.

15. The method of claim 9, wherein the providing step provides a worst case value for at least one of the operational outputs.

16. The method of claim 15, wherein the providing step provides the worst case value for one or more operational outputs selected by the user.

17. The method of claim 1, wherein the reactor being simulated is a boiling water reactor.

18. The method of claim 1, wherein the reactor being simulated is a pressure water reactor.

19. A method for obtaining a reactor simulation, comprising:
identifying, with a computer processor, an existing response surface, the existing response surface defining relationships between design input and operational outputs of at least one or more aspects of a core design;
inputting, with the computer processor, values of one or more of the design inputs;
receiving, with the computer processor, one or more reactor simulation results for a reactor simulation of the existing response surface with the input values.

20. The method of claim 19, wherein the input values include at least one of control blades positions over time, bundle types of fresh fuel, loading pattern of exposed fuel, and water flow through the reactor core.

21. The method of claim 19, wherein the operational outputs include at least one of critical power ratio (CPR), shutdown margin (SDM), maximum average planar linear heat generation rate (MAPLHGR), maximum fraction of linear power density (MFLPD), Hot excess reactivity, radial and axial power peaking, peak fuel rod and bundle exposure, Uranium utilization as measured by reactor energy output produced (in mega-watt-days) per kilogram of Uranium-235 loaded.

22. The method of claim 19, wherein the receiving step receives the reactor simulation results in real time.

23. The method of claim 19, wherein the existing response surface includes information defining a plurality of predictors, each predictor predicting one of the operational outputs based on one of the design inputs.

24. The method of claim 23, wherein each predictor is one of a second order polynomial and a linear function.

25. The method of claim 19, wherein the receiving step receives an old objection function value for the core design prior to inputting values of one or more design variables and receives a new objective function value for the core design after inputting values of one or more design variables.

26. The method of claim 25, wherein a same objective function is used to determine the old and new objective function values.

27. The method of claim 26, wherein the same objective function is the objective function used to create the core design.

28. The method of claim 26, wherein the same objective function is a different objective function than an objective function used to create the core design.

29. The method of claim 25, wherein different objective functions are used to determine the old and new object function values.

30. The method of claim 19, wherein the receiving step receives a worst case value for at least one of the operational outputs.

31. The method of claim 30, wherein the providing step provides the worst case value for one or more operational outputs selected by the user.

32. The method of claim 19, wherein the reactor being simulated is a boiling water reactor.

33. The method of claim 19, wherein the reactor being simulated is a pressure water reactor.

34. A method of operating a nuclear reactor, comprising:
operating a nuclear reactor using a reactor simulation generated using with a computer processor based on an existing response surface for a core design and input received from a user, the input including values of design input variables used in creating the existing response surface, the existing response surface defining relationships between the design input variables and operational outputs of at least one or more aspects of the core design.

* * * * *